(12) United States Patent
Combes et al.

(10) Patent No.: US 9,232,480 B2
(45) Date of Patent: Jan. 5, 2016

(54) METHOD FOR CONTROLLING POWER IN MOBILE NETWORKS

(75) Inventors: Richard Combes, Paris (FR); Zwi Altman, Chatillon (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/128,881

(22) PCT Filed: Jun. 20, 2012

(86) PCT No.: PCT/FR2012/051390
§ 371 (c)(1),
(2), (4) Date: Nov. 26, 2014

(87) PCT Pub. No.: WO2012/175869
PCT Pub. Date: Dec. 27, 2012

(65) Prior Publication Data
US 2014/0113678 A1 Apr. 24, 2014

(30) Foreign Application Priority Data
Jun. 24, 2011 (FR) .................................. 11 55604

(51) Int. Cl.
*H04W 52/00* (2009.01)
*H04W 52/24* (2009.01)
(Continued)

(52) U.S. Cl.
CPC .......... *H04W 52/246* (2013.01); *H04W 52/343* (2013.01); *H04W 52/143* (2013.01); *H04W 52/241* (2013.01); *H04W 52/242* (2013.01)

(58) Field of Classification Search
CPC ............................. H04W 52/246; H04W 52/04
USPC ........... 455/522, 69, 67.11, 452.1, 452.2, 509
See application file for complete search history.

(56) References Cited

U.S. PATENT DOCUMENTS

| 6,667,965 B1 * | 12/2003 | Yamaura et al. ............... 455/522 |
| 2006/0159061 A1 * | 7/2006 | Takano et al. .................. 370/352 |
| 2008/0026782 A1 * | 1/2008 | Kwon et al. ................... 455/522 |

FOREIGN PATENT DOCUMENTS

WO 0038348 A1 6/2000

OTHER PUBLICATIONS

International Search Report and Written Opinion dated Jul. 24, 2012 for corresponding International Application No. PCT/FR2012/051390, filed Jun. 20, 2012.
(Continued)

*Primary Examiner* — John J Lee
(74) *Attorney, Agent, or Firm* — David D. Brush; Westman Champlin & Koehler, P.A.

(57) ABSTRACT

A method for controlling power in a mobile network. The method includes, for each server station s, where s=1, ..., A, belonging to a group of A server stations, where A≥2, each emitting with a power $P_s^{(b)}$, where b=1, ..., B, in B sub-bands of frequencies, with B≥1, the following steps: a) receiving, from mobile terminals served by the server station s, measurements of radio parameters performed by these mobile terminals; b) calculating a predetermined value $V_{s,t}^{(b)}$, where b∈[1, ..., B] and t∈[1, ..., A], by using the measurements; c) transmitting to at least one other server station t, or an associate device, the respective value $V_{s,t}^{(b)}$, and reception, from at least the server station t or by the associated device, of the analogous value $V_{t,s}^{(b)}$; d) calculating, by using the value $V_{t,s}^{(b)}$, derivatives $$\frac{\partial U}{\partial P_s^{(b)}},$$

where U is a predetermined utility function for the network, and e) updating transmission powers $P_s^{(b)}$ to reduce the value of the utility function U.

11 Claims, 2 Drawing Sheets

(51) Int. Cl.
*H04W 52/34* (2009.01)
*H04W 52/14* (2009.01)

(56) References Cited

OTHER PUBLICATIONS

Richard Combes et al., "Self-Organizing Fractional Power Control for Interference Coordination in OFDMA Networks", ICC 2011—2011 IEEE International Conference on Communications—Jun. 5-9, 2011—Kyoto, Japan, IEEE, Piscataway, NJ, USA, Jun. 5, 2011, pp. 1-5, XP031909186.

English translation of International Search Report dated Jul. 24, 2012 for corresponding International Application No. PCT/FR2012/051390, filed Jun. 20, 2012.

* cited by examiner

METHOD FOR CONTROLLING POWER IN MOBILE NETWORKS

CROSS-REFERENCE TO RELATED APPLICATIONS

This Application is a Section 371 National Stage Application of International Application No. PCT/FR2012/051390, filed Jun. 20, 2012, which is incorporated by reference in its entirety and published as WO 2012/175869 on Dec. 27, 2012, not in English.

FIELD OF THE DISCLOSURE

The invention relates to the field of mobile networks. The invention relates, in particular, to the determination of the power emitted by the server stations in a mobile network.

BACKGROUND OF THE DISCLOSURE

It is well known, for example in cellular mobile networks, that the interference phenomena between the multiple signals emitted by the base stations and received by a mobile terminal greatly limit the QoS (acronym for "Quality of Service") offered to the users of the network, and also the overall quantity of traffic that the network can manage. The effect of the intercellular interference is particularly noticeable along the cell boundaries, since for a user situated in the center of a cell, the strength of the useful signal greatly exceeds that of the interfering signals; the QoS therefore especially depends on the users situated at the cell boundary; this is why the engineers responsible for the optimization of the network from the operational perspective invest much of their efforts in the optimization of the network at the cell boundary.

It is possible to combat the intercellular interference phenomena by planning accordingly the power of each base station within the band, or each sub-band, of frequencies of the emission spectrum: this is referred to as "power control".

The article by R. Combes, Z. Altman, and E. Altman entitled *"Self-organizing fractional power control for interference coordination in OFDMA networks"* (IEEE ICC 2011) provides a dynamic method for power control in mobile networks of the OFDMA type (acronym for "Orthogonal Frequency-Division Multiple Access"). In this method, it is considered that, within a cellular mobile network, a group of A base stations each emitting with a power $P_s^{(b)}$, where s=1,..., A and b=1,..., B, in B sub-bands of frequencies. Each base station implements, in an iterative manner (for example periodic), the following steps:
a) reception, from mobile terminals served by said base station s, of measurements of radio parameters performed by these mobile terminals,
b) calculation, for b=1, ..., B and t-1, ..., A, of predetermined values $V_{s,t}^{(b)}$ by means of said measurements,
c) transmission to the other base stations of said values $V_{s,t}^{(b)}$, and reception, from the other base stations, of the analogous values $V_{s,t}^{(b)}$,
d) calculation, by means of said values $V_{t,s}^{(b)}$, of the derivatives $$\frac{\partial U}{\partial P_s^{(b)}},$$

where U is a predetermined utility function for said network, and
e) update of the transmission powers $P_s^{(b)}$ so as to reduce the value of said utility function U.

More precisely, according to this method:

$$U = \sum_{s=1}^{A} U_s,$$

where $U_s$ is a predetermined function of the data rates delivered by the base station s.

With regard to the step a), if said radio parameters comprise the attenuation (also referred to as "Reference Signal Received Power", or RSRP), the measurements may for example be in accordance with the standard 3GPP TS 36.214, "Evolved Universal Terrestrial Radio Access (E-UTRA); Physical layer", Section 5.1.1 ("Measurements"). The transmission of these measurements to the server base station is, for example, in accordance with the standard 3GPP TS 36.331 "Evolved Universal Terrestrial Radio Access (E-UTRA); Radio Resource Control (RRC); Protocol Specification", Sections 5.5 ("Measurements") and 6.3.5 ("Measurement information elements").

With regard to the step c), the communications between neighboring base stations belonging to an OFDMA network of the 3GPP LTE type (acronym for "Long Term Evolution") can, for example, use the "X2" interface.

This known method has several drawbacks:
it optimizes a metric associated with the instantaneous QoS of the network; however, such metrics cannot be directly linked to the mean quality criteria, which are the true measurements of quality in which the operator is interested, for example the communications blocking rate or the mean time for file transfer;
the optimality (even partial) of this method has not been proven; it is therefore possible for there to be some scenarios in which this known method degrades the state of the network instead of improving it; and
nor has the stability of this method been proven; the question of the stability is essential in the sense that no operator will wish to implement such a method in their network without cast-iron guarantees with regard to the stability and the resistance to noise.

This method converges toward a stable configuration only with the assumption—obviously unrealistic—of a constant number of users over time and of infinite durations of communication. As it does not converge toward a stable configuration under real conditions of use, it is impossible, based on the observation, even over a very long time, of the dynamic behavior of an implementation of the method, to deduce from this a planning for the emission power of the base stations within the band, or the sub-bands, of frequencies.

It is clear that the aforementioned problem of interference affects practically all the types of mobile networks, whether they be cellular (2G, 3G, and so on) or wireless (WiFi, Bluetooth, and so on). The present invention relates to all these types of networks, in which mobile terminals exchange radiofrequency communications with equipment (base stations, access points, relay-stations, and so on) that will all be denoted under the name of "server stations".

SUMMARY

The present invention therefore relates to a method for controlling power in a mobile network, said method comprising, for each server station s, where s=1, ..., A, belonging to a group of A server stations, where A≥2, each emitting with a power $P_s^{(b)}$ where b=1, ..., B, within B sub-bands of frequencies, with B≥1, the following steps:

a) reception, from mobile terminals served by said server station s, of measurements of radio parameters performed by these mobile terminals, b) calculation of at least one predetermined value $V_{s,t}^{(b)}$, where b∈[1, ..., B] and t∈[1, ..., A], by means of said measurements, c) transmission to at least one other server station t, or a device associated with this server station t, of the respective value $V_{s,t}^{(b)}$, and reception, from at least said server station t or by said associated device, of the analogous value $V_{t,s}^{(b)}$, d) calculation, by means of at least said value $V_{t,s}^{(b)}$, of the derivatives $$\frac{\partial U}{\partial P_s^{(b)}},$$

where U is a predetermined utility function for said network, and e) update of the transmission powers $P_s^{(b)}$ so as to reduce the value of said utility function U.

This method is noteworthy in that:

the utility function $U=U(\bar{\rho}_1, ..., \bar{\rho}_A)$ is an increasing function of the load $\bar{\rho}_s$, where s=1, ..., A, defined over a predetermined period of time T, of each server station of said group, said load $\bar{\rho}_s$ depending on the intensities of traffic arriving in the geographical area $D_s$ served by the server station s and on the data rates delivered by this server station, and said value $V_{t,s}^{(b)}$ is representative of the quantity $$\frac{\partial \bar{\rho}_t}{\partial P_s^{(b)}}.$$

Thanks to these dispositions, the interference phenomena in a mobile network can be very efficiently reduced, by adjusting the power transmitted by each server station over the band, or each of the sub-bands, of emission frequencies. Indeed, just by making a judicious choice of said period T, the utility function according to the invention is directly linked to average quality criteria for the network (blocking rate, file transfer time, and so on) that are directly usable by the operator, and hence to the average QoS of the network.

It will be noted that the method according to the invention takes into account the quantity of traffic arriving in the geographical area served by each server station. Its performance characteristics are, for this reason, better than the known methods in situations where the quantity of traffic varies substantially from one geographical area to another, which situations are notably encountered in heterogeneous mobile networks, such as femto/macro networks.

Furthermore, it can be demonstrated mathematically that the power control method according to the invention organizes, on the basis of an implementation of the method for a period of time that is sufficiently long, a convergence of the power configuration toward an optimum stable state, and it will do this irrespective of the fluctuations in the traffic.

Lastly, the power control method according to the invention also offers the following advantages:

the signaling load is very low and compatible with the capacities available over the links between server stations (X2 interface in LTE);

the processing load is low because the calculation of the gradient is performed by means of explicit formulae, and no simulation is needed; and the method is distributed: each station updates its own power; there is no centralized entity responsible for coordinating the various stations.

According to particular features, said load is defined by the expression:

$$\bar{\rho}_s = \int_{D_s} \frac{\lambda_{\vec{r}}}{\gamma_{\vec{r}}} d^2\vec{r},$$

where $\lambda_{\vec{r}}$ is the areal intensity of the traffic arriving at the point $\vec{r}$, and $\gamma_{\vec{r}}$ is the maximum data rate that the server station s is capable of delivering at the point $\vec{r}$.

Thanks to these dispositions, said load $\bar{\rho}_s$ is such that each quantity $$\frac{\partial \bar{\rho}_t}{\partial P_s^{(b)}},$$

where s,t=1, ..., A and b=1, ..., B, may conveniently be evaluated based on measurements of radio parameters performed within the network by the mobile terminals and by the server stations during said period T.

According to even more particular features, said quantity $$\frac{\partial \bar{\rho}_t}{\partial P_s^{(b)}}$$

is obtained by taking the average, over iterations performed during said period T, of the quantities $$\frac{\partial \rho_{t,m}}{\partial P_s^{(b)}},$$

where the index m counts the iterations, and the random load $\rho_{t,m}$ is defined by:

$$\rho_{t,m} = \frac{1}{T_m} \sum_{j=1}^{N_{t,m}} \frac{\sigma_j}{\gamma_j},$$

where the index j, where j=1, ..., $N_{t,m}$, counts the communications initiated within the geographical area $D_t$ during a period of duration $T_m<T$, or else a predetermined selection of these communications, $\gamma_j$ is the data rate for the communication n°j, and $\sigma_j$ is the file size for the communication n°j.

Thanks to these dispositions, (the derivatives of) the "physical" load $\bar{\rho}_s$ may conveniently be estimated by calculating random samples over successive periods (adjoining or otherwise, and of duration $T_m$ equal to one another or otherwise) taken within the period of duration T.

In a correlated manner, the invention relates to a device for controlling power within a mobile network, said device being associated with a server station s, where s∈[1, ..., A], belonging to a group of A server stations, where A≥2, each emitting with a power $P_s^{(b)}$ where b=1, ..., B, in B sub-bands of frequencies, with B≥1, said device comprising means for:
receiving, from mobile terminals served by said server station s, measurements of radio parameters performed by these mobile terminals,
calculating at least one predetermined value $V_{s,t}^{(b)}$, where b∈[1, ..., B] and t∈[1, ..., A], by means of said measurements,
transmitting to at least one other server station t, or a device associated with this server station t, the respective value $V_{s,t}^{(b)}$, and receiving, from at least said server station t or by said associated device, the analogous value $V_{t,s}^{(b)}$,
calculating, by means of at least said value $V_{t,s}^{(b)}$, the derivatives $$\frac{\partial U}{\partial P_s^{(b)}},$$

where U is a predetermined utility function for said network, and
updating the transmission powers $P_s^{(b)}$ so as to reduce the value of said utility function U.
This device is noteworthy in that:
the utility function $U=U(\overline{\rho}_1, \ldots, \overline{\rho}_A)$ is an increasing function of the load $\overline{\rho}_s$, where s=1, ..., A, defined over a predetermined period of time T, of each server station of said group, said load $\overline{\rho}_s$ depending on the intensities of traffic arriving in the geographical area $D_s$ served by the server station s and on the data rates delivered by this server station, and
said value $V_{t,s}^{(b)}$ is representative of the quantity $$\frac{\partial \overline{\rho}_t}{\partial P_s^{(b)}}.$$

According to particular features, said load is defined by the expression:

$$\overline{\rho}_s = \int_{D_s} \frac{\lambda_{\vec{r}}}{\gamma_{\vec{r}}} d^2 \vec{r},$$

where
$\lambda_{\vec{r}}$ is the areal intensity of the traffic arriving at the point $\vec{r}$, and
$\gamma_{\vec{r}}$ is the maximum data rate that the server station s is capable of delivering at the point $\vec{r}$.
According to even more particular features, this device furthermore possesses means for obtaining said quantity $$\frac{\partial \overline{\rho}_t}{\partial P_s^{(b)}}$$

by taking the average, over iterations performed during said period T, of the quantities $$\frac{\partial \rho_{t,m}}{\partial P_s^{(b)}},$$

where the index m counts the iterations, and the random load $\rho_{t,m}$ is defined by:

$$\rho_{t,m} = \frac{1}{T_m} \sum_{j=1}^{N_{t,m}} \frac{\sigma_j}{\gamma_j},$$

where
the index j, where j=1, ..., $N_{t,m}$, counts the communications initiated within the geographical area $D_t$ during a period of duration $T_m<T$, or else a predetermined selection of these communications,
$\gamma_j$ is the data rate for the communication n°j, and
$\sigma_j$ is the file size for the communication n°j.
According to particular features, any one of the power control devices presented succinctly hereinabove, in the context of a electronic circuit, could be implemented. This electronic circuit could, for example, consist of a cabled logic chip.

The advantages offered by these devices are essentially the same as those offered by the correspondingly correlated methods presented succinctly hereinabove.

The invention is also aimed at a server station of a mobile network, comprising a device such as described succinctly hereinabove.

As a variant, it could be envisioned that, for certain server stations at least, the associated device will be hosted outside of the server station, for example within a management center operated by the operator of the mobile network.

Lastly, the invention is also aimed at a computer program downloadable from a communications network and/or stored on a computer-readable medium and/or executable by a microprocessor. This computer program is noteworthy in that it comprises instructions for the execution of the steps of any one of the power control methods, presented succinctly hereinabove, when it is executed on a computer.

The advantages offered by these devices and this computer program are essentially the same as those offered by said methods.

BRIEF DESCRIPTION OF THE DRAWINGS

Other aspects and advantages of the invention will become apparent upon reading the detailed description hereinbelow of particular embodiments, presented by way of non-limiting examples. The description makes reference to the appended drawings, in which.

DETAILED DESCRIPTION OF ILLUSTRATIVE EMBODIMENTS

Within a mobile network, a group of A server stations is considered, each emitting with a power $P_s^{(b)}$ where $s=1, \ldots, A$ and $b=1, \ldots, B$, in B sub-bands of frequencies. Preferably, all of the server stations in the network will be taken into account during the implementation of the method according to the invention.

Figure 1:
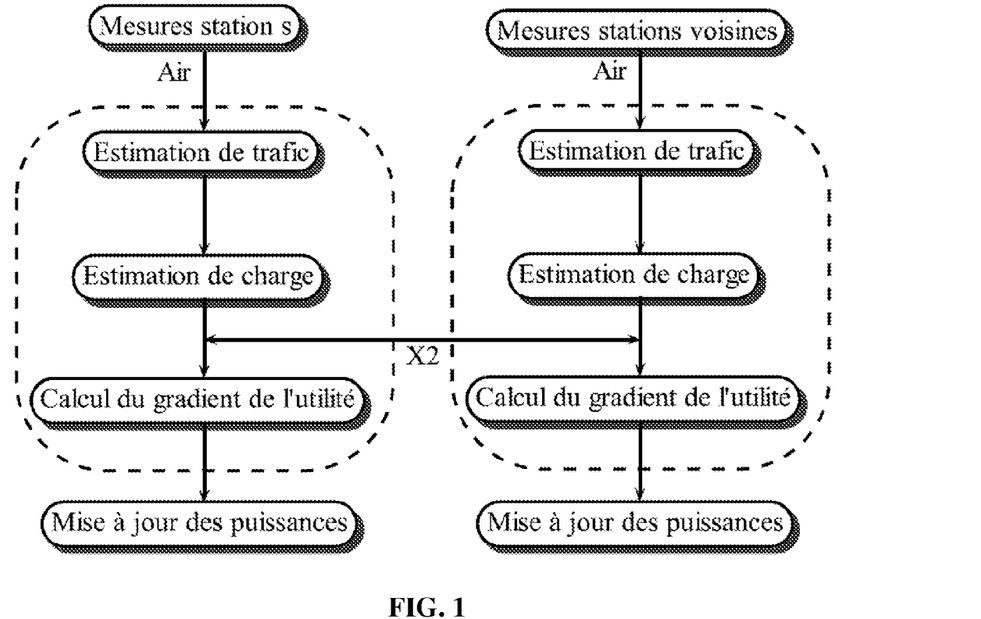
FIG. 1 is a flow diagram of the main steps of one embodiment of the method according to the invention.

FIG. 1 illustrates schematically the main steps of one embodiment of the power control method according to the invention. In this embodiment, a (b) given server station only transmits the aforementioned data $V_{s,t}^{(b)}$ to the server stations that are "neighboring" (in the sense defined hereinbelow), the reason for this being to limit the number of messages associated with the implementation of the invention to what is actually useful.

In FIG. 1:

the labels "Station measurements s" and "Neighboring station measurements" represent, in this embodiment, the step a) (see hereinabove) of the method;

the labels "Estimation of traffic" represent, according to the invention, the measurement by each server station of the traffic arriving at this station;

the labels "Estimation of load" represent the step b) (see hereinabove) of the method;

the double arrow labeled "X2" represents the step c) (see hereinabove) of the method;

the labels "Calculation of the gradient of the utility" represent the step d) (see hereinabove) of the method; and the labels "Update of the powers" represent the step e) (see hereinabove) of the method.

Setting $h_{s \to \vec{r}}$ as the mean attenuation of the signal between a server station s and a point $\vec{r}$ of the network, the Signal over Interference plus Noise Ratio (SINR) at a point $\vec{r}$ served by a station s is equal to:

$$R_{\vec{r}}^{(b)} = \frac{h_{s \to \vec{r}} P_s^{(b)}}{\theta^2 + \sum_{s' \neq s} h_{s' \to \vec{r}} P_{s'}^{(b)}}, \quad (1)$$

where $\theta^2$ is the thermal noise. It will be noted that the current mobile terminals are capable of measuring, for each signal detected:

the attenuation,
the numerator of the SINR, and
the denominator of the SINR.

$D_s$ denotes the geographical area served by the server station s. In other words:

$$D_s = \{\vec{r} \mid h_{s \to \vec{r}} \geq h_{s' \to \vec{r}} \forall s'\}.$$

By definition, a server station s considers another server station s' to be its "neighbor" if there exists at least one point $\vec{r}$ of $D_s$ such that the attenuation $h_{s' \to \vec{r}}$ is higher than a predetermined threshold.

Now, $\bar{\rho}_s$ is taken to be the load of the server station s, defined over a predetermined period T (for example, 1 hour). Preferably, this period is chosen in such a manner as to be characteristic of the variation over time of the mean values of the radio parameters of the network in question.

According to the invention, firstly, each load $\bar{\rho}_s$ depends:

on the intensities of traffic arriving in the geographical area $D_s$ served by the server station s, and on the data rates delivered by this server station.

"The intensity of traffic" is also known by the term "bit arrival rate". It will be noted that said traffic relates to communications initiated during the period T.

According to the invention, secondly, a utility function $U = U(\bar{\rho}_1, \ldots, \bar{\rho}_A)$ is defined as being an increasing function of each load $\bar{\rho}_s$ ($s=1, \ldots, A$) of the group, for example:

$$U = \sum_{s=1}^{A} \alpha_s \bar{\rho}_s, \quad (2)$$

where the coefficients $\alpha_s$ as are predetermined real numbers that are strictly positive.

A set of values for emission power $P_s^{(b)}$ is then sought such that the utility function U is minimized. For this purpose, the conventional method, known as the "gradient descent" method, may for example be used, which here consists in progressively approaching a minimum of U by successively updating the set of emission powers, in accordance with the formula:

$$P_s^{(b)} \leftarrow P_s^{(b)} - \varepsilon_m \frac{\partial U}{\partial P_s^{(b)}} \text{ for } b = 1, \ldots, B \text{ and } s = 1, \ldots, A, \quad (3)$$

where m is an integer numbering the successive updates, and $\epsilon_m$ is a "small" positive real number, preferably decreasing from one update to the next. These updates take place at predetermined moments in time, for example at regular intervals.

These updates consequently require the calculation of the partial derivatives $$\frac{\partial U}{\partial P_s^{(b)}} = \sum_{t=1}^{A} \frac{\partial U}{\partial \bar{\rho}_t} \frac{\partial \bar{\rho}_t}{\partial P_s^{(b)}}, \quad (4)$$

where the partial derivatives $$\frac{\partial U}{\partial \bar{\rho}_t}$$

are known; in the example of the equation (2) hereinabove:

$$\frac{\partial U}{\partial \bar{\rho}_t} = \alpha_t.$$

Each partial derivative $$\frac{\partial \bar{\rho}_t}{\partial P_s^{(b)}}$$

must therefore be able to be evaluated, where $s,t=1, \ldots, A$, and $b=1, \ldots, B$.

In the present embodiment, each server station s receives, from each neighbor server station t, a value representative of the quantity $$\frac{\partial \rho_t}{\partial P_s^{(b)}}$$

(together with, where a non-linear utility function is chosen, the load values themselves), which allows it to update its emission power $P_s^{(b)}$.

As indicated hereinabove, it may be shown that, advantageously, the iteration of these updates is certain to lead to a convergence of the utility function U toward a local minimum, such that all of the server stations in question reach a stable equilibrium configuration; this equilibrium configuration varies in parallel (where it does vary) over a period of time even longer than the period T as a function of the variations in the traffic.

In the present embodiment of the invention, the following expression is chosen for the load:

$$\overline{\rho}_s = \int_{D_s} \frac{\lambda_{\vec{r}}}{\gamma_{\vec{r}}} d^2 \vec{r}, \tag{5}$$

where
$\lambda_{\vec{r}}$ is the areal intensity (measured for example in bit/s/m²) of the traffic arriving at the point $\vec{r}$, and $\gamma_{\vec{r}}$ is the maximum data rate (measured for example in bits/s) that the server station s is capable of delivering at the point $\vec{r}$ (i.e. the data rate attainable if the station were only to send data to this point $\vec{r}$).

Conventionally:

$$\gamma_{\vec{r}} = \sum_{1 \leq b \leq B} f(R_{\vec{r}}^{(b)}), \tag{6}$$

where $f$ is a function known to those skilled in the art. It is recalled that this function $f$ models the impact of the fluctuations of the attenuation on the data rate (a phenomena known by the term "fading") for the radio system in question, and notably for the radio technology (OFDMA, CDMA, or other) implemented.

It will be noted that the expression given by the equation (5) actually represents the load on the server station s; indeed, satisfying the requirements as regards exchanges of data from the terminals served by this server station simply corresponds to the condition:

$$\overline{\rho}_s < 1$$

The expression for the load $\overline{\rho}_t$ given by the equation (5) is advantageously a function of quantities measurable by the mobile terminals and by the server stations. The situation will therefore be the same for the derivatives of this load with respect to the powers $P_s^{(b)}$, these derivatives being, as explained hereinabove, required for calculating the gradient of the utility.

One practical means for estimating the load $\overline{\rho}_s$ consists in calculating samples during each of the successive periods of duration $T_m$ (for example, 1 s), where m is the aforementioned iteration index and $T_m < T$. These samples, which will be referred to as "random loads" $\rho_{s,m}$, are chosen in such a manner that their average over m is equal to the load $\overline{\rho}_s$.

In the present embodiment, said random load is defined according to the expression:

$$\rho_{s,m} = \frac{1}{T_m} \sum_{i=1}^{N_{s,m}} \frac{\sigma_i}{\gamma_i}, \tag{7}$$

where
the index $i=1, \ldots, N_{s,m}$ counts the communications initiated during the period $T_m$ within the geographical area $D_s$ (or else a predetermined selection of these communications), each communication n°i being associated with the reception of data by a mobile terminal situated at the point $\vec{r}_i$, $\gamma_i$ is the data rate for the communication n°i, and $\sigma_i$ is the file size for the communication n°i, this size being measured by the server station s.

It can indeed be shown that the average over m of the $\rho_{s,m}$ is equal to $\overline{\rho}_s$.

This results in, for $s, t=1, \ldots, A$, and $b=1, \ldots, B$:

$$\frac{\partial \rho_{t,m}}{\partial P_s^{(b)}} = -\frac{1}{T_m} \sum_{j=1}^{N_{t,m}} \frac{\sigma_j}{\gamma_j^2} \frac{\partial \gamma_j}{\partial P_s^{(b)}}, \tag{8}$$

where the index j numbers the communications initiated during $T_m$ within the geographical area $D_t$.

Reference to the equation (6) hereinabove yields the following:

$$\frac{\partial \gamma_j}{\partial P_s^{(b)}} = f'(R_j^{(b)}) \frac{\partial R_j^{(b)}}{\partial P_s^{(b)}}, \tag{9}$$

where $R_j^{(b)}$ denotes the SINR of the communication n°j in which a mobile terminal, situated at the point $\vec{r}_j$ of the geographical area $D_t$, participates. In view of the equation (1), the following is finally obtained:

$$\frac{\partial R_j^{(b)}}{\partial P_s^{(b)}} = \frac{h_{t \to \vec{r}_j}}{\theta^2 + \sum_{s' \neq t} h_{s' \to \vec{r}_j} P_{s'}^{(b)}} \tag{10a}$$

for
$t = s$,
and $$\frac{\partial R_j^{(b)}}{\partial P_s^{(b)}} = -\frac{h_{s \to \vec{r}_j} h_{t \to \vec{r}_j} P_t^{(b)}}{\left[\theta^2 + \sum_{s' \neq t} h_{s' \to \vec{r}_j} P_{s'}^{(b)}\right]^2} \tag{10b}$$

for
$t \neq s$.

It is therefore possible for each station t to calculate $$\frac{\partial R_j^{(b)}}{\partial P_s^{(b)}}$$

starting from the measurements (attenuations, SINR numerators and denominators) fed back by the mobile terminals that it serves. It will be noted in this respect that a given server station has no need, in order to update its own emission power, to know the emission powers of the other stations.

Thus, all the ingredients are available that are needed to be able to carry out the update n°m of the values of emission power $P_s^{(b)}$.

Figure 2:
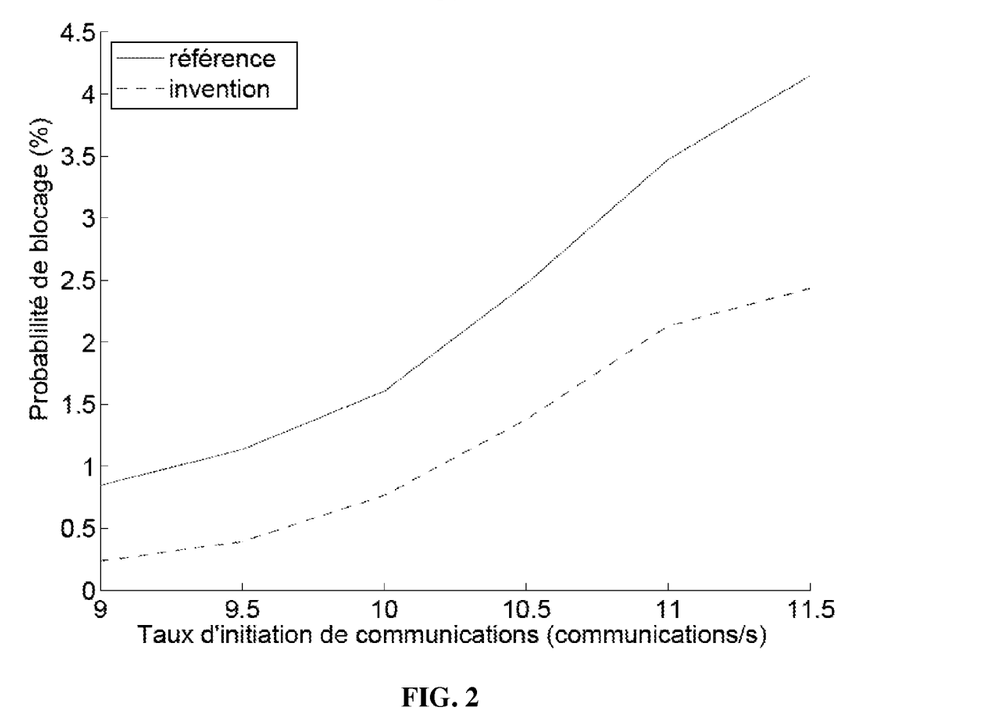
FIG. 2 is a graph of the mean blocking rate in the network, on the one hand, without power control and, on the other hand, with the power control according to the invention.
Figure 3:
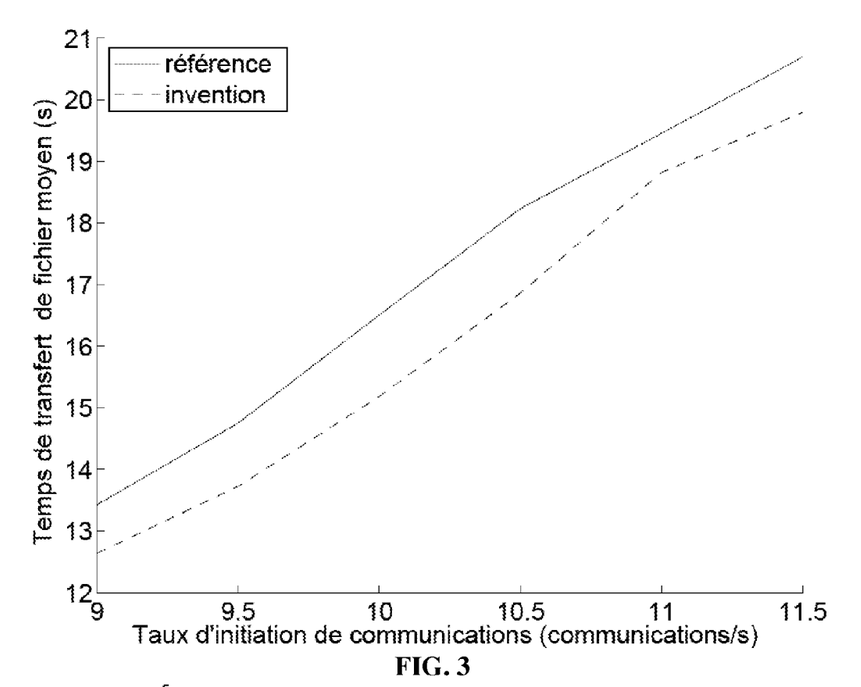
FIG. 3 is a graph of the mean total data rate of the network, on the one hand, without power control and, on the other hand, with the power control according to the invention.
Figure 4:
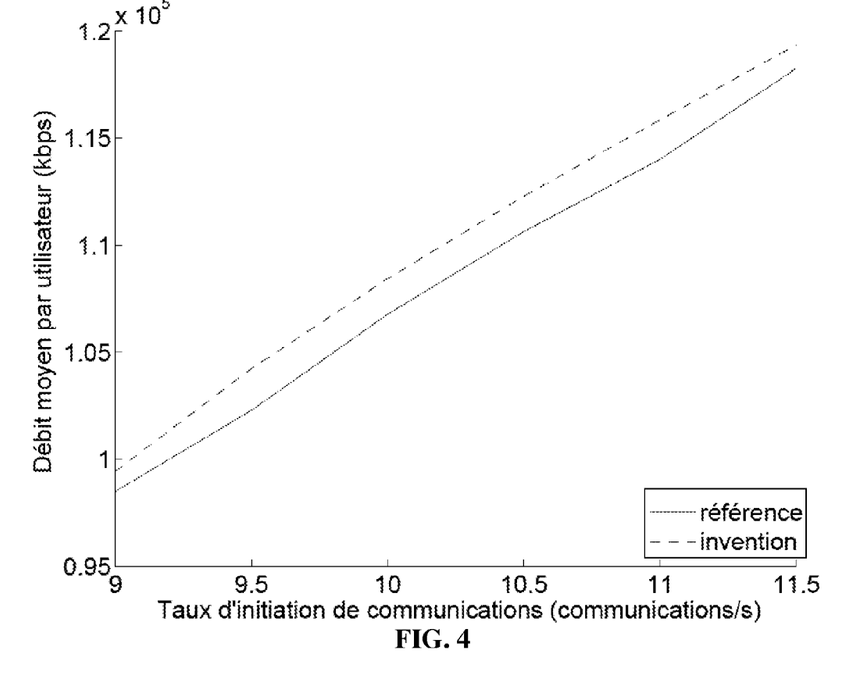
FIG. 4 is a graph of the mean file transfer time in the network, on the one hand, without power control and, on the other hand, with the power control according to the invention.

FIGS. 2, 3 and 4 illustrate the benefits of the invention on the basis of a simulation of a network using OFDMA technology. In these figures, a network implementing the invention is compared with a network, known as a "reference network", without power control, in other words a network in which each station emits at its nominal power without taking into account other stations, and hence, notably, without taking intercellular interference into account. More precisely, FIG. 2 is a graph of the mean blocking rate within the network as a function of the mean arrival rate, FIG. 3 is a graph of the mean throughput of the network as a function of the mean arrival rate, and FIG. 4 is a graph of the mean file transfer time within the network as a function of the mean arrival rate; the "mean arrival rate" refers to the average, over the surface area of the network, of the areal intensity of traffic $\lambda_T^{\rightarrow}$ considered hereinabove.

The invention is, in particular, applicable to cellular networks of the OFDMA type, such as LTE and WiMax networks. The invention is also applicable to cellular networks of the CDMA/WCDMA type such as HSPA, in which there is generally only a single band of frequencies, i.e. B=1. Irrespective of the application, as explained hereinabove, those skilled in the art will choose, in a known manner, the appropriate function $f$ for modeling the fluctuations of the channel.

The invention is, more generally, applicable to adjustment algorithms for any given parameter of a server station according to measurements coming from the mobiles and from the server stations. Indeed, the method according to the invention allows many behaviors of the network to be controlled in terms of mean quality criteria. The following may thus, for example, be controlled:

the power of the pilot channels for each station in order to perform optimizations of cell size;

the 'handover' margins (automatic intercellular transfer) for optimizing the intercellular mobility; and various problems of allocation of resources within heterogeneous networks, for example of the macro/femto type.

The invention may be implemented at nodes, for example server stations, of mobile networks, by mean of software and/or hardware components. The software components will be able to be integrated into a conventional network node management computer program.

This is the reason why, as indicated hereinabove, the present invention also relates to a data processing system implementing the power control method described hereinabove. This data processing system comprises, in a conventional manner, a central processing unit controlled by signals, a memory, together with an input unit and an output unit.

In addition, this data processing system may be used for executing a computer program comprising instructions for the implementation of the power control method according to the invention.

Indeed, the invention is also aimed at a computer program downloadable from a communications network comprising instructions for the execution of the steps of a power control method according to the invention, when it is executed on a computer. This computer program can be stored on a computer-readable medium and can be executable by a microprocessor.

This program may use any given programming language, and can take the form of source code, object code, or code intermediate between source code and object code, in a partially compiled form or any other desired form.

The invention is also aimed at an information medium, non-removable, or partially or totally removable, readable by a computer, and comprising instructions of a computer program such as mentioned hereinabove.

The information medium may be any given entity or device capable of storing the program. For example, the medium can comprise a storage means, such as a ROM, for example a CD ROM or a microelectronic circuit ROM, or else a magnetic recording means, for example a USB flash drive or a hard disk.

On the other hand, the information medium may be a transmissible medium such as an electrical or optical signal, which can be transported via an electrical or optical cable, by radio or by of other means. The computer program according to the invention may, in particular, be uploaded onto a network of the Internet type.

As a variant, the information medium can be an integrated circuit into which the computer program is incorporated, the circuit being designed to execute, or to be used in the execution of, the method according to the invention.

Although the present disclosure has been described with reference to one or more examples, workers skilled in the art will recognize that changes may be made in form and detail without departing from the scope of the disclosure and/or the appended claims.

The invention claimed is:

1. A method for controlling power in a mobile network, said method comprising, for each server station s, where s=1, . . . , A, belonging to a group of A server stations, where A≥2, each emitting with a power $P_s^{(b)}$, where b=1, . . . , B, within B sub-bands of frequencies, with B≥1, the following steps:

a) reception, from mobile terminals served by said server station s, of measurements of radio parameters performed by these mobile terminals, b) calculation of at least one predetermined value $V_{s,t}^{(b)}$, where b∈[1, . . . , B] and t∈[1, . . . , A], by means of said measurements, c) transmission to at least one other server station t, or a device associated with this server station t, of the respective value $V_{s,t}^{(b)}$, and reception, from at least said server station t or by said associated device, of the analogous value $V_{t,s}^{(b)}$, d) calculation, by means of at least said value $V_{t,s}^{(b)}$, of the derivatives $$\frac{\partial U}{\partial P_s^{(b)}},$$

where U is a predetermined utility function for said network, and e) update of the transmission powers $P_s^{(b)}$ so as to reduce the value of said utility function U, wherein:

the utility function $U=U(\bar{\rho}_1, \ldots, \bar{\rho}_A)$ is an increasing function of the load $\bar{\rho}_s$, where s=1, . . . , A, defined over a predetermined period of time T, of each server station of said group, said load $\bar{\rho}_s$ depending on the intensities of traffic arriving in the geographical area $D_s$ served by the server station s and on the data rates delivered by this server station, and said value $V_{t,s}^{(b)}$ is representative of the quantity $$\frac{\partial \overline{\rho}_t}{\partial P_s^{(b)}}.$$

2. The power control method as claimed in claim 1, wherein said load is defined by the expression:

$$\overline{\rho}_s = \int_{D_s} \frac{\lambda_{\vec{r}}}{\gamma_{\vec{r}}} d^2 \vec{r},$$

where
- $\lambda_{\vec{r}}$ is the areal intensity of the traffic arriving at the point $\vec{r}$, and
- $\gamma_{\vec{r}}$ is the maximum data rate that the server station s is capable of delivering at the point $\vec{r}$.

3. The power control method as claimed in claim 2, wherein said quantity $$\frac{\partial \overline{\rho}_t}{\partial P_s^{(b)}}$$

is obtained by taking the average, over iterations performed during said period of time T, of the quantities $$\frac{\partial \rho_{t,m}}{\partial P_s^{(b)}},$$

where the index m counts the iterations, and the random load $\rho_{t,m}$ is defined by:

$$\rho_{t,m} = \frac{1}{T_m} \sum_{j=1}^{N_{t,m}} \frac{\sigma_j}{\gamma_j},$$

where
- the index j, where j=1, ..., $N_{t,m}$, counts the communications initiated within the geographical area $D_t$ during a period of duration $T_m < T$, or else a predetermined selection of these communications,
- $\gamma_j$ is the data rate for the communication n°j, and
- $\sigma_j$ is the file size for the communication n°j.

4. The power control method as claimed in, claim 1, wherein, during said step c), each server station s only communicates with the neighboring server stations t, a server station t being considered as neighboring the server station s if there exists, within the geographical area $D_s$, at least one point $\vec{r}$ such that the attenuation $h_{t \to \vec{r}}$ between the server station t and this point $\vec{r}$ is greater than a predetermined threshold.

5. A device for controlling power within a mobile network, said device being associated with a server station s, where s∈[1, ..., A], belonging to a group of A server stations, where A≥2, each emitting with a power $P_s^{(b)}$, where b=1, ..., B, within B sub-bands of frequencies, with B≥1, said device comprising means for:
- receiving, from mobile terminals served by said server station s, measurements of radio parameters performed by these mobile terminals,
- calculating at least one predetermined value $V_{s,t}^{(b)}$, where b∈[1, ..., B] and t∈[1, ..., A], by means of said measurements,
- transmitting to at least one other server station t, or a device associated with this server station t, the respective value $V_{s,t}^{(b)}$, and receiving, from at least said server station t or by said associated device, the analogous value $V_{t,s}^{(b)}$,
- calculating, by means of at least said value $V_{t,s}^{(b)}$, the derivatives $$\frac{\partial U}{\partial P_s^{(b)}},$$

where U is a predetermined utility function for said network, and
- updating the transmission powers $P_s^{(b)}$ so as to reduce the value of said utility function U, wherein:
the utility function $U=U(\overline{\rho}_1, \ldots, \overline{\rho}_A)$ is an increasing function of the load $\overline{\rho}_s$, where s=1, ..., A, defined over a predetermined period of time T, of each server station of said group, said load $\overline{\rho}_s$ depending on the intensities of traffic arriving in the geographical area $D_s$ served by the server station s and on the data rates delivered by this server station, and said value $V_{t,s}^{(b)}$ is representative of the quantity $$\frac{\partial \overline{\rho}_t}{\partial P_s^{(b)}}.$$

6. The power control device as claimed in claim 5, wherein said load is defined by the expression:

$$\overline{\rho}_s = \int_{D_s} \frac{\lambda_{\vec{r}}}{\gamma_{\vec{r}}} d^2 \vec{r},$$

where
- $\lambda_{\vec{r}}$ is the areal intensity of the traffic arriving at the point $\vec{r}$, and
- $\gamma_{\vec{r}}$ is the maximum data rate that the server station s is capable of delivering at the point $\vec{r}$.

7. The power control device as claimed in claim 6, furthermore comprising means for obtaining said quantity $$\frac{\partial \overline{\rho}_t}{\partial P_s^{(b)}}$$

by taking the average, over iterations performed during said period T, of the quantities $$\frac{\partial \rho_{t,m}}{\partial P_s^{(b)}},$$

where the index m counts the iterations, and the random load $\rho_{t,m}$ is defined by:

$$\rho_{t,m} = \frac{1}{T_m} \sum_{j=1}^{N_{t,m}} \frac{\sigma_j}{\gamma_j},$$

where
- the index j, where j=1, ..., $N_{t,m}$, counts the communications initiated within the geographical area $D_t$ during a period of duration $T_m < T$, or else a predetermined selection of these communications,
- $\gamma_j$ is the data rate for the communication n°j, and
- $\sigma_j$ is the file size for the communication n°j.

8. An electronic circuit, comprising a power control device as claimed in claim 5.

9. The electronic circuit as claimed in claim 8, wherein the electronic circuit is formed by a cabled logic chip.

10. A server station for a mobile network, comprising a power control device as claimed in claim 5.

11. A non-removable, partially removable or totally removable non-transitory data storage medium containing program code instructions for executing power control method for controlling power in a mobile network, said method comprising, for each server station s, where s=1, ..., A, belonging to a group of A server stations, where A≥2, each emitting with a power $P_s^{(b)}$, where b=1, ..., B, within B sub-bands of frequencies, with B≥1, the following steps:

a) reception, from mobile terminals served by said server station s, of measurements of radio parameters performed by these mobile terminals, b) calculation of at least one predetermined value $V_{s,t}^{(b)}$, where b∈[1, ..., B] and t∈[1, ..., A], by means of said measurements, c) transmission to at least one other server station t, or a device associated with this server station t, of the respective value $V_{s,t}^{(b)}$, and reception, from at least said server station t or by said associated device, of the analogous value $V_{t,s}^{(b)}$, d) calculation, by means of at least said value $V_{t,s}^{(b)}$, of the derivatives $$\frac{\partial U}{\partial P_s^{(b)}},$$

where U is a predetermined utility function for said network, and e) update of the transmission powers $P_s^{(b)}$ so as to reduce the value of said utility function U, wherein:
the utility function $U = U(\overline{\rho}_1, \ldots, \overline{\rho}_A)$ is an increasing function of the load $\overline{\rho}_s$, where s=1, ..., A, defined over a predetermined period of time T, of each server station of said group, said load $\overline{\rho}_s$ depending on the intensities of traffic arriving in the geographical area $D_s$ served by the server station s and on the data rates delivered by this server station, and said value $V_{t,s}^{(b)}$ is representative of the quantity $$\frac{\partial \overline{\rho}_t}{\partial P_s^{(b)}}.$$

* * * * *